United States Patent

[11] 3,591,971

| [72] | Inventor | Troy Tanner<br>3104 Emogene St., Mobile, Ala. 36606 |
|---|---|---|
| [21] | Appl. No. | 842,995 |
| [22] | Filed | July 18, 1969 |
| [45] | Patented | July 13, 1971 |

[54] WATER AERATOR
2 Claims, 4 Drawing Figs.

| [52] | U.S. Cl. | 43/56,<br>119/5 |
|---|---|---|
| [51] | Int. Cl. | A01k 97/04 |
| [50] | Field of Search | 43/56, 57,<br>55; 119/5 |

[56] References Cited
UNITED STATES PATENTS

| 1,465,497 | 8/1923 | Tandy | 43/56 UX |
|---|---|---|---|
| 2,272,561 | 2/1942 | Hubbell | 43/56 |

*Primary Examiner*—Samuel Koren
*Assistant Examiner*—Daniel J. Leach
*Attorney*—Peck & Peck ABSTRACT: An aerator for aerating water in a bait container, or the like comprising water reservoir permanently or removably mounted on the rim of a bait container. Openings are provided in the walls of the water reservoir for applying a plurality of streams of water to the surface of the water in the bait container to produce aerating bubbles therein.

INVENTOR
TROY TANNER

BY
Pech & Pech
ATTORNEYS

WATER AERATOR

This invention relates broadly to the art of aerating water or other liquids, and in its more specific aspects it relates to a water reservoir permanently or removably mounted on the periphery or rim of a bait container to provide one or more streams of water continuously flowing to the surface of the water contained in the bait bucket to cause aeration thereof; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

While I shall disclose and discuss this invention as being applied to a bait container for aerating the water therein in order to provide fresh water to keep the contained bait alive, it is to be distinctly understood that my invention is not limited to the aeration of water in bait containers, and may be used in a variety of adaptations wherein it is desirable to aerate water in a container.

Many various means have been devised for aerating the water in bait containers, however, as far as I am aware, such prior art means and methods involve relatively complicated arrangements and often require ice so that the water melting therefrom will flow drop by drop into the bait container. Additionally, one of the disadvantages of prior art arrangements resides in the construction of such apparatus wherein the water reservoir is so associated with the bait container that a substantial area of the upper open end of the water or bait container is blocked off by the reservoir, thus access to the water or bait container may be a difficult and cumbersome operation.

In the prior art structures, with which I am familiar, the reservoir for the aerating water, or ice, is permanently attached in some manner to the water container, or is removably attached thereto by means which require fastening and unfastening, and other manipulations of elements in order to attach the reservoir to the water container or to remove it therefrom. It will be obvious that such known arrangements substantially reduce the usability of the apparatus and often present problems to the user of the aerating device.

I have overcome the above-mentioned problems, as well as others, by providing a water reservoir which, when operatively associated with the water container does not substantially reduce the access area to the container.

I have developed a water reservoir which is adapted to be mounted on the upper periphery, or rim, of the water container and to extend thereabout in substantially the same configuration as that of the upper end of the water container.

In one form of my invention the water reservoir is permanently affixed to the water container, at the upper open edge thereof, and means is provided on the water reservoir for carrying the entire unit, comprising the water reservoir and the water container. In this form of my invention it will be appreciated that the water reservoir and water container may be manufactured as one integral unit, and such unit, comprising the water reservoir and the water container, is easily portable.

In a further form of my invention I have provided a water reservoir which is adapted to be removably mounted on the upper rim of the water container and is configured the same as the upper configuration of the water container so that the open access area to the water container is not substantially reduced by the water reservoir. In this form of the invention, where the water reservoir is removably mounted on the rim at the open end of the water container, the construction provides a highly advantageous feature which permits the water reservoir to be mounted on, or removed from, the rim of the water container without requiring the manipulation of any securing elements. Thus, it will be appreciated that the mounting and removal of reservoirs on bait containers is greatly facilitated, due to the ingenious construction and arrangement which I have devised.

It has been one of my purposes, in the development of this invention, to provide a water reservoir which may easily be produced to conform to the configuration of the water, or bait container, and which may be varied according to the desires of the user, as to its water capacity.

The aerating process is substantially more successful if means is provided in the water reservoir whereby the aerating liquid will flow onto the surface of the water in the water container in a steady minute stream rather than drop by drop, and I have provided means for achieving such desirable results.

It will be recognized that it is highly desirable, in this particular discipline, to provide such an arrangement which is economical to produce, and under normal usage will be endowed with long-lasting qualities. My aerating apparatus may be reasonably produced and is of sturdy construction so that it will have long-lasting qualities under normal use conditions.

With the foregoing general objects features and results in view, as well as certain others which will be apparent from the following explanation, the invention consists in certain novel features in design, construction, mounting, and combination of elements, as will be more fully and particularly referred to and specified hereinafter.

Referring to the accompanying drawings.

Figure 1:
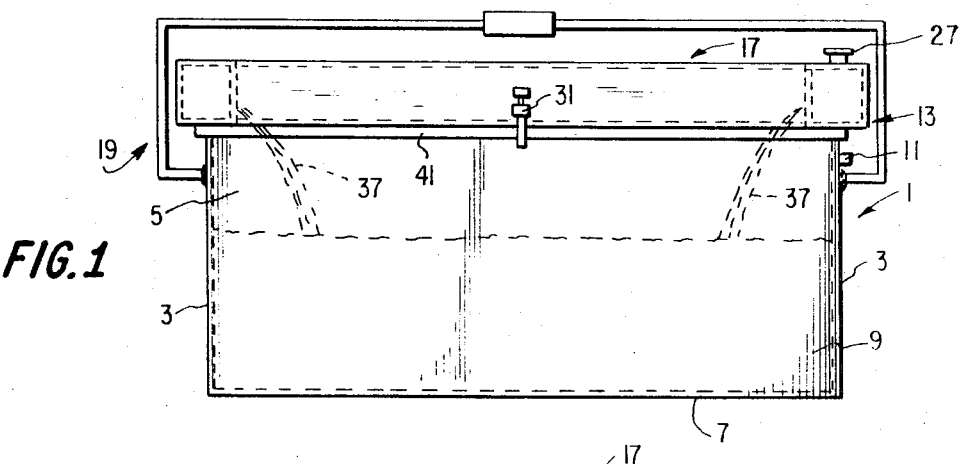
FIG. 1 is a side view in elevation of one form of the water container with the water reservoir permanently mounted in operative position thereon.
Figure 2:
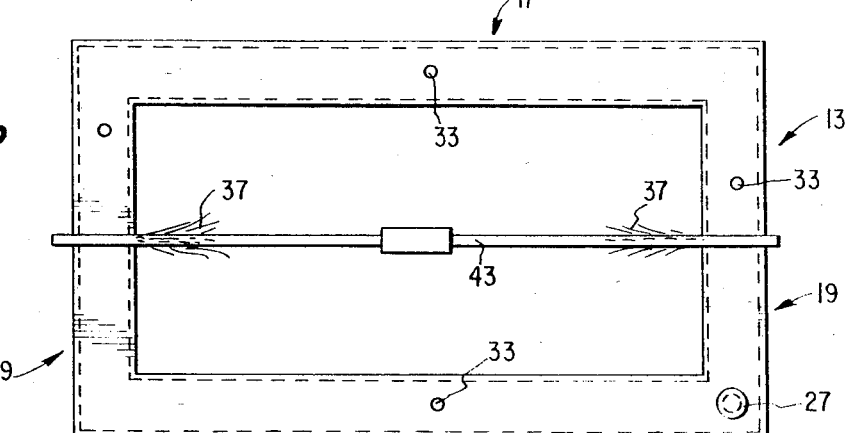
FIG. 2 is a top plan view of the water container of FIG. 1 with the water reservoir permanently mounted thereon.

In the accompanying drawings, and particularly FIGS. 1 and 2, I have used the numeral 1 to designate in its entirety the water or bait container. The water or bait container is open at its top, is provided with end walls 3, sidewalls 5, and a bottom 7 and is, of course, adapted to contain a body of water 9 therein in which the bait is kept. In certain adaptations and uses of the water container it may be desirable to provide an overflow nozzle 11. The purpose of this will be apparent as this description proceeds. In the example disclosed in the drawings I have illustrated the water container 1 as being of rectangular configuration; however, it is to be distinctly understood that the water container may be made in any desirable shape.

Figure 4:
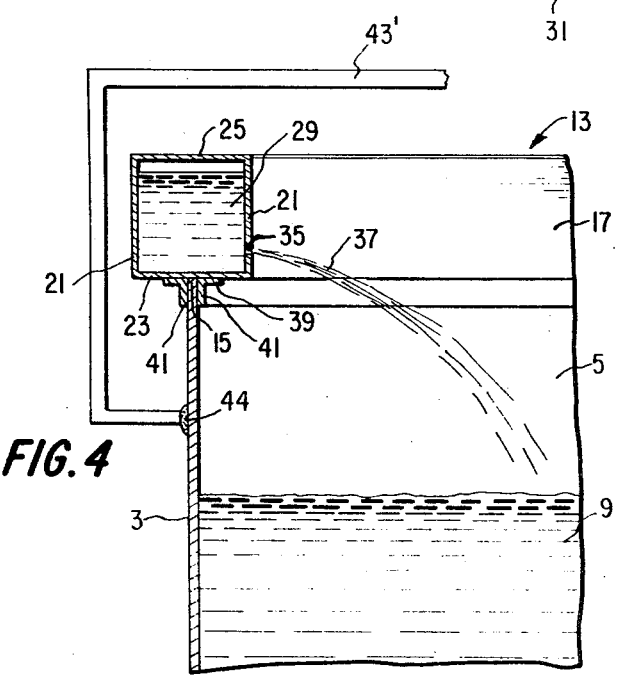
FIG. 4 is a view in section illustrating the particular means for removably mounting the water reservoir on the water container.
Figure 3:
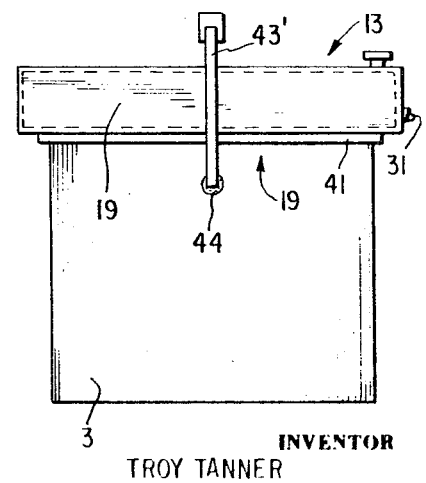
FIG. 3 is a view in side elevation of another form of my invention wherein the water reservoir is removably mounted on the water container.

The water reservoir has been designated generally by the numeral 13 and is shaped, or configured, to conform to the shape, or configuration, of the water container 1, and the water reservoir contains the water which is fed onto the water 9 in the water container 1 to provide aerating bubbles therein to maintain the body of water 9 in fresh condition to keep the bait alive. The reservoir 13 is formed to provide an interiorly communicating tank for containing a body of aerating water, and is shaped to conform to the shape of the water container and, as will become apparent as this description proceeds, may be removably mounted, as in FIGS. 3—4, on the rim or upper edges 15 of the water container to extend fully and completely along the upper rims of the side and end walls of the water container. Thus, the water reservoir comprises a pair of side sections 17 of substantially the same length as the sides 5 of the water container, and the side sections 17 are connected at each end by end sections 19, which are of substantially the same length as the end walls 3 of the water container. All of the sections of the water reservoir are connected together, and in internal communication with each other, and each section is provided with upright sidewalls 21, a bottom wall 23, and a top or closure 25. (See FIG. 4) A capped filling opening 27 is provided at any desirable location on the top 25 of the reservoir and when the closure cap is removed the reservoir may be filled with a body of aerating water 29, and it will be recognized that in the operation of filling the reservoir with water, the water will flow from the filling opening through all of the sections of the water reservoir. I may also provide a drain plug 31 in the water reservoir for draining water therefrom, as desired, and any suitable number of vents 33 may be provided on the top of the reservoir sections for venting air into the reservoir as water is removed therefrom in the aerating operation.

In the example illustrated in the drawings I have provided minute openings 35 in the inner sidewalls 21 of the end sections 19 of the water reservoir so that a steady stream of water 37 may flow from the reservoir through the openings 35 therein, and onto the surface of the body of water 9 in the water container to cause bubbling action and resulting aeration thereof. It is to be appreciated that I may provide more than a pair of aerating water discharge openings 35 in the reservoir, and I may reposition them, and such arrangement will fall within the spirit and scope of my invention.

I have provided an ingenious arrangement for facilitating either the permanent mounting or the removable mounting of the water reservoir on and extending along the upper edges or rim of the water container. Such improved and highly advantageous mounting arrangement for the water reservoir consists of welding or otherwise securing a plate 39 to the bottom walls 23 of each section of the reservoir. This plate is fastened, in any suitable manner, to the bottom of each section of the water reservoir and preferably, though no necessarily, extends the entire length of each section. Consideration of the drawings will make it clear that the plate 39 is centered relative to the transverse dimensions of the bottoms 23. Depending downwardly from the plate 39, in spaced apart relation, are a pair of flanges 41, such flanges being spaced apart a slightly greater distance than the thickness of the end walls and sidewalls 3 and 5, respectively, of the water container, so that the flanges will have a sliding fit with respect to the side and end walls.

In the form of my invention illustrated in FIGS. 1 and 2 of the drawings, where the combination water reservoir and water container comprises a unitary structure, the bottom 23 of the water reservoir may be provided with the depending flanges 41 as discussed above, and as particularly illustrated in FIG. 4 of the drawings. In FIGS. 1 and 2, where the combination unitary structure is formed, the flanges 41 may be affixed in any suitable manner, as by welding, to the upper edges of the walls of the water container to securely fasten the water reservoir and the water container together. I provide a bail 43 which is pivotally affixed in any suitable manner to the water reservoir, so that the unitary combination of the water reservoir and the water container may be carried from place to place to produce an easily portable combination. It is to be recognized that any other suitable method of permanently attaching the water reservoir to the water container may be used and therefore it is not essential to the success of my unitary combination that the mounting arrangement of FIG. 1 be used, this is merely shown as one example from among many. The water reservoir and water container when produced as a unit may be manufactured as an integral combination in any suitable manner.

Since the water reservoir 13 conforms to the configuration of the rim or upper edges of the water container 1, the water reservoir may be operatively mounted on the rims or upper edges of the walls of the water container merely by placing the reservoir in such position that the flanges 41 will slidably receive the upper portions of the walls 3 and 5, and said upper edges will engage the plate 39 to thereby support the water reservoir in mounted operative position. This method of operatively mounting the water reservoir on the upper edges of the rims of the water container may be followed whether or not the water reservoir is being permanently mounted on the water container or whether it is being removably mounted thereon. In the former case the additional step of permanently affixing the flanges to the walls is followed.

When the water reservoir is being removably mounted on the water container it will be appreciated that this may be done with great facility since no manipulation of fastening members, or the like, is necessary. It is only necessary to so place the reservoir that the rims or edges of all of the walls of the water container will be slidably received within and between the depending flanges 41 on the bottoms of the sections of the reservoir.

The entire combination, where the water reservoir is removably mounted on the water container, is made portable by means of a bail 43' which is pivotally affixed as at 44 to the water container. Thus, by lifting the bail 43' the entire combination may be carried from place to place. It is within my contemplation to also provide a bail on the water reservoir to facilitate the removal of the reservoir from its mounted position on the container when desired.

With the water reservoir removably mounted on the water container it will be evident that lateral movement of the water reservoir with respect to the water container will be prevented by the association of the depending flanges with the upper portions of the walls of the water container.

The mounting components on the water reservoir, whether permanently or removably mounted, are so mounted relative to the water container so that when one reservoir is mounted on the water container substantially one-half of each section of the reservoir will extend inwardly and over the open upper end of the water container, while the other half of each section of the reservoir will extend outwardly beyond the side and end walls of the water container. The transverse dimensions of all of the sections of the reservoir are such that the access opening to the water container at the upper end thereof, is only slightly diminished in area by the mounted position of the water reservoir. It will be evident that since only a half portion of each section of the water reservoir extends inwardly from the walls of the reservoir, a large central access opening will remain, and constitutes an unobstructed access area.

It is within my contemplation to place the plate 39 and depending flanges 41 on the bottom 21 of each section of the reservoir in spaced relation therealong, or to provide only one length of the section to which it is applied. While I have disclosed, as one example from among many, a reservoir, comprised of several sections which interiorly communicate with each other, each section could be independent of each other section and such construction would fall within the spirit and scope of this invention.

The water reservoir and water container may be constructed from any suitable material, such as metal, fibrous material, and the like.

I claim:

1. A water aerator including, in combination, a water container having an open upper end, providing an access area, and a water reservoir adapted to contain aerating water, said water reservoir being removably mounted on the upper edges of the walls of the water container and including portions extending inwardly of the water container a distance leaving the major portion of said upper open end of the water container unobstructed, water discharge ports being provided in said extending portions, and said water reservoir is provided with means depending from the bottom thereof for receiving the upper portions of the walls of the water container for removably mounting the water reservoir thereon.

2. A water aerator in accordance with claim 1, wherein said means comprises a pair of spaced apart depending flanges, the spacing between the depending flanges being substantially equal to the thickness of the walls of the water container for receiving the upper portions of the walls therebetween with a sliding fit.